US010693305B2

(12) United States Patent
Baier et al.

(10) Patent No.: US 10,693,305 B2
(45) Date of Patent: Jun. 23, 2020

(54) DEVICE FOR CHARGING AND DISCHARGING A CAPACITIVE LOAD

(71) Applicant: CONTINENTAL AUTOMOTIVE GMBH, Hannover (DE)

(72) Inventors: Andreas Baier, Regensburg (DE); Philipp Schiller, Regensburg (DE); Walter Schrod, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 467 days.

(21) Appl. No.: 15/591,958

(22) Filed: May 10, 2017

(65) Prior Publication Data

US 2017/0338680 A1 Nov. 23, 2017

(30) Foreign Application Priority Data

May 17, 2016 (DE) ........................ 10 2016 208 375

(51) Int. Cl.
*H02J 7/00* (2006.01)
*F02D 41/20* (2006.01)
(Continued)

(52) U.S. Cl.
CPC ............ *H02J 7/0068* (2013.01); *F02D 41/20* (2013.01); *H02J 7/00* (2013.01); *H02M 1/44* (2013.01);
(Continued)

(58) Field of Classification Search
CPC ............. H02M 3/33507; H02M 3/1582; H02J 7/0068; H02J 7/0062
See application file for complete search history.

(56) References Cited

U.S. PATENT DOCUMENTS 6,016,040 A 1/2000 Hoffmann et al.
6,081,061 A 6/2000 Reineke et al.
(Continued)

FOREIGN PATENT DOCUMENTS

CN 1228874 A 9/1999
CN 104205609 A 12/2014
(Continued)

OTHER PUBLICATIONS

German Office Action dated Dec. 19, 2016 for corresponding German Patent Application No. 10 2016 208 375.9.
(Continued)

*Primary Examiner* — David V Henze-Gongola

(57) ABSTRACT

A capacitive load charging/discharging device, including a first capacitor, a down-up converter including a first and a second switching element connected across the first capacitor, wherein a connecting point of the switching elements is connected to a first output terminal of the converter through a main coil. The device further includes an output circuit with a capacitive load arranged between first and second output circuit terminals, which are connected to output terminals of the converter. A discharge circuit is formed with the output circuit, the main coil and the second switching element, including an additional capacitor which is connected to a charging circuit for charging to a specified voltage, wherein the polarity of the voltage corresponds to that of the load voltage in the charged state of the capacitive load.

16 Claims, 7 Drawing Sheets

(51) Int. Cl.
*H02M 1/44* (2007.01)
*H02M 3/158* (2006.01)
*H02M 3/335* (2006.01)
*H02N 2/06* (2006.01)
*F02M 63/00* (2006.01)

(52) U.S. Cl.
CPC ..... *H02M 3/1582* (2013.01); *H02M 3/33507* (2013.01); *H02N 2/06* (2013.01); *F02D 2041/2003* (2013.01); *F02D 2041/2058* (2013.01); *F02M 63/0026* (2013.01); *H02J 2207/20* (2020.01)

(56) References Cited

U.S. PATENT DOCUMENTS

| | | |
|---|---|---|
| 7,777,459 B2 | 8/2010 | Williams |
| 2013/0201729 A1 | 8/2013 | Ahsanuzzaman et al. |
| 2015/0048718 A1* | 2/2015 | Etzler ................ F02D 41/2096 310/318 |
| 2015/0138848 A1 | 5/2015 | Lehn et al. |

FOREIGN PATENT DOCUMENTS

| | | |
|---|---|---|
| DE | 10203217037 | 9/2013 |
| DE | 102012204576 A1 | 9/2013 |
| EP | 0871230 A1 | 10/1998 |
| JP | 20150515419 A | 5/2010 |
| WO | 2016069799 A1 | 5/2016 |

OTHER PUBLICATIONS

Korean Office Action dated Aug. 16, 2018 for corresponding Korean Patent Application No. 10-2017-0059491.
Chinese Office Action dated Jun. 11, 2019 for corresponding Chinese Patent Application No. 201710347941.6.
Chinese Office Action dated Mar. 15, 2019 for corresponding Chinese Patent Application No. 201710347941.6.
KoreanNotice of Allowance dated Feb. 27, 2019 for corresponding Korean application 10-2017-0059491.

* cited by examiner

DEVICE FOR CHARGING AND DISCHARGING A CAPACITIVE LOAD

This U.S. patent application claims the benefit of German application No. 10 2016 208 375.9, filed May 17, 2016, which is hereby incorporated by reference herein.

FIELD OF INVENTION

The invention relates to a circuit technique with which the working range of switched-mode power supply units (DC-DC converters) can be extended, which are, for example, used for charging and discharging piezo injection valves (injectors). The piezo valve (piezo injector) in this case represents a capacitive load for the converter.

BACKGROUND

The use of piezo injection valves has the advantage with combustion engines that the fuel for each combustion cycle can be distributed over a plurality of precise portions, and that an improved mixing of fuel and oxygen can thus be achieved. The combustion process can in this way be designed for lower pollution and more efficiency.

In directly driven piezo injection valves in particular, the fuel throughput is adjusted in that a piezo drive (stack) coupled with the jet needle is subjected to defined charge/energy. The energy applied creates a proportional force at the drive which generates a deflection at a mechanically or hydraulically coupled jet needle, and so permits a regulation of the fuel throughput.

This places high demands on the charging/discharging electronics, which is usually implemented in the form of a DC-DC converter. The electronics must apply defined charge/energy to the capacitively operating drive of the piezo injector in a short time with high precision, robustness and efficiency, and with good repeatability, and must discharge it again in a defined manner at the end of the injection process. A large number of injections following closely on one another can thus be generated in each combustion cycle in order to create the most homogeneous possible fuel-air mixture.

The converter must feed a defined charge to the piezo injector in a short time under current control, and charge the load from 0 V to up to 250 V. At the end of the injection process, the load must also again be discharged from up to 250 V down to 0 V. For reasons of power loss, cost and efficiency, it is desirable to recover the highest possible proportion of the charge transferred back from the injector into the converter.

Two-quadrant switched-mode power supply units are usually used for this in order to transfer charge from the internal store of the converter into the load and back again into the converter under bidirectional operation.

EP 0 871 230 B1 discloses a device and a method for charging and discharging a piezoelectric element, as is illustrated in FIG. 1.

That document relates to a simple down-up converter BUCK/BOOST with a first upstream DC-DC converter DCDC1, a discharge path LINEAR DISCHARGE, and a selection circuit SELECTION, along with the capacitive load $C_{PIEZO}$ which represents the piezo element of an injection valve.

The down-up converter BUCK/BOOST is constructed as a half-bridge with a first transistor M1 to which a second transistor M2 is connected in series, while diodes D1, D2, for example in the form of substrate diodes, are connected in parallel with the transistors M1, M2, respectively. The connecting point of the two transistors M1, M2 is connected through a main coil $L_{MAIN}$ and an LC low-pass filter to the supply terminal of the capacitive load $C_{PIEZO}$. The LC low-pass filter is formed with a filter capacitor $C_{FILT}$ and a filter coil $L_{EMC}$, and is connected through a first shunt resistor $R_{SH1}$, used for current measurement, to the ground terminal GND of the circuit.

The first DC-DC converter DCDC1 is formed in the illustrated embodiment as a fly back converter, but may however also be realized by other converter types. It includes a transformer, whose primary winding PW is connected on one side through an EMC (Electro Magnetic Compatibility) filter to the positive terminal of a battery voltage VBAT, and on the other side through a transistor M0, with which a diode is connected in parallel, to the ground terminal of the battery voltage GND. The one terminal of the secondary winding SW is connected through a diode $D_{DCDC}$ to the terminal that carries a positive voltage of an intermediate circuit capacitor $C_{DCDC}$, and the other terminal of the secondary winding SW is connected to the ground terminal GND, to which the other terminal of the intermediate circuit capacitor $C_{DCDC}$ is also connected.

The supply terminal of the capacitive load $C_{PIEZO}$ is connected through a discharge transistor M7, a diode connected in parallel and a current measuring resistor $R_{SP}$, which is connected in series with the discharge transistor M7 to the ground terminal GND.

The other terminal of the capacitive load $C_{PIEZO}$ is connected through a selection transistor M3 with a diode connected in parallel and a second shunt resistor $R_{SH2}$, which is connected in series with the selection transistor M3 and serves to measure current, to the ground terminal GND of the circuit. The series circuit of the capacitive load $C_{PIEZO}$ with the selection transistor M3 and with the second shunt resistor $R_{SH2}$ may have further such series circuits connected in parallel with it, which is regularly the case in the application for injection valves for combustion engines.

The first DC-DC converter DCDC1 creates a buffered intermediate circuit voltage $V_{DC}$ at the intermediate circuit capacitor $C_{DCDC}$. While the piezo element $C_{PIEZO}$ is being charged, the down-up converter BUCK/BOOST operates, considered simply, as a step-down converter (buck mode), and as a step-up converter (boost mode) during discharge. During charging, a current is created in the main coil $L_{MAIN}$ by pulse-width-modulated switching-on of the first transistor M1. While the first transistor M1 is switched on, the diode D2 is at first in blocking mode, and the current in the main coil $L_{MAIN}$ rises in accordance with equation (1):

$$i_L = \frac{1}{L}\int u \cdot dt \tag{1}$$

The differential current in the main coil $L_{MAIN}$ during the phase when the first transistor M1 is switched on can be approximately described by equation (2):

$$\frac{di}{dt} = \frac{VDC - VPIEZO}{L_{MAIN}} \tag{2}$$

During the time when the first transistor M1 is switched off, the diode D2 acts as a freewheeling path for the coil current, and the energy stored in the main coil $L_{MAIN}$ is removed by the flow of current into the capacitive load $C_{PIEZO}$. The differential current through the main coil $L_{MAIN}$ in this phase can be approximately described by equation (3):

$$\frac{di}{dt} = \frac{VDC - VPIEZO}{L_{MAIN}} \quad (3)$$

In accordance with equation (2), the fall in the current depends on the potential difference between the voltage VDC at the intermediate circuit capacitor $C_{DCDC}$ and the voltage VPIEZO at the capacitive load $C_{PIEZO}$, which becomes smaller and smaller as the load voltage VPIEZO rises. The smaller the potential difference, the longer the time for the set current in the main coil $L_{MAIN}$ to develop. If VPIEZO gets closer to VDC, the charging current through the main coil $L_{MAIN}$ is limited by the nature of the system, and is pinched off. Only load voltages VPIEZO that are lower than the intermediate circuit voltage VDC can thus be reached.

When discharging the load, the down-up converter BUCK/BOOST operates, considered simply, as a step-up converter. The load functions as a voltage source for the converter, which is operated with pulse-width modulation, as when charging. While the second transistor M2 is switched on, a current is developed in the main coil $L_{MAIN}$ in accordance with equation (4). In this case, the diode D1 of the first transistor M1 is blocking.

$$\frac{di}{dt} = \frac{VPIEZO}{L_{MAIN}} \quad (4)$$

During the phase in which the second transistor M2 is switched off, feeding back (recovery) of the energy stored in the main coil $L_{MAIN}$ into the intermediate circuit capacitor $C_{DCDC}$ takes place. In this case, the current flows out of the capacitive load $C_{PIEZO}$ through the diode D1 back into the $C_{DCDC}$. Equation (5) applies here. Diode D2 is blocking here.

$$\frac{di}{dt} = \frac{VPIEZO - VDC}{L_{MAIN}} \quad (5)$$

An extended down-up converter BUCK/BOOST is described in DE 10 2012 204 576 A1 and illustrated in FIG. 2. The same components are given the same reference signs there as in FIG. 1.

In contrast to the down-up converter BUCK/BOOST of FIG. 1, the down-up converter BUCK/BOOST of DE 10 2012 204 576 A1 is formed with a full bridge which, in addition to the transistors M1, M2 of the first half-bridge, includes a second half-bridge with transistors M21 and M22 connected in series, wherein (substrate) diodes D21 and D22 are again connected in parallel with these transistors M21 and M22, respectively. The main coil $L_{MAIN}$ is connected between the connecting points of the respective transistors M1 and M2, M21 and M22, respectively, of the two half-bridges. The second half-bridge is connected in parallel with the filter capacitor $C_{FILT}$, so that the first shunt resistor $R_{SH1}$ can also be used as the current measuring resistor for the current when charging the main coil $L_{MAIN}$.

Here again, a first DC-DC converter DCDC1 generates a buffered intermediate circuit VDC at an intermediate circuit capacitor $C_{DCDC}$. The down-up converter BUCK/BOOST with two half-bridges operates during the charging and discharging, considered simply, as a flyback converter. During charging, a current is created in the main coil $L_{MAIN}$ by simultaneous pulse-width-modulated switching-on of the transistors M1 and M22. While the transistors M1 and M22 are switched on, the diodes D2 and D21 are at first in blocking mode, and the current in the main coil $L_{MAIN}$ rises in accordance with equation (6):

$$i_L = \frac{1}{L}\int u \cdot dt \quad (6)$$

The differential current in the main coil $L_{MAIN}$ during the phase when the transistors M1 and M2 are switched on can be described by equation (7):

$$\frac{di}{dt} = \frac{VDC}{L_{MAIN}} \quad (7)$$

During the time when the transistors M1 and M22 are switched off, the diodes D2 and D21 act as a freewheeling path for the coil current, and the energy stored in the main coil $L_{MAIN}$ is removed by the flow of current into the capacitive load $C_{PIEZO}$. The differential current in the main coil $L_{MAIN}$ can be described here by equation (8):

$$\frac{di}{dt} = \frac{-VPIEZO}{L_{MAIN}} \quad (8)$$

In accordance with equation (7), the development of current in the main coil $L_{MAIN}$ depends on the voltage VDC at the intermediate circuit capacitor $C_{DCDC}$, but is independent of the load voltage VPIEZO. This has the consequence that, regardless of the level of the output voltage, energy may always be stored in the main coil $L_{MAIN}$, which is then transferred during the freewheeling phase to the capacitive load $C_{PIEZO}$. This permits the generation of output voltages VPIEZO that are higher than the intermediate circuit voltage VDC. The load voltage VPIEZO may thus become as high as desired, limited only by the dielectric strength of the components in use.

When discharging the capacitive load, the converter operates, similarly to when charging, as a flyback converter. The load functions as a voltage source for the converter, which is also operated with pulse-width modulation. While the transistors M2 and M21 are switched on, a current is developed in the main coil $L_{MAIN}$ in accordance with equation (9).

$$\frac{di}{dt} = \frac{VPIEZO}{L_{MAIN}} \quad (9)$$

During the phase in which the transistors M2 and M21 are switched off, feeding back (recovery) of the energy stored in the main coil $L_{MAIN}$ into the intermediate circuit capacitor $C_{DCDC}$ takes place. In this case, the main coil $L_{MAIN}$ drives a current through the diodes D1 and D22 back into the intermediate circuit capacitor $C_{DCDC}$. Equation (10) applies here.

$$\frac{di}{dt} = \frac{-VDC}{L_{MAIN}} \qquad (10)$$

Now, with the two solutions described above, as a result of equations (4) and (9), the problem arises when discharging that the development of current in the main coil $L_{MAIN}$ depends on the load voltage VPIEZO, which becomes smaller and smaller as the load $C_{PIEZO}$ becomes increasingly discharged. The smaller the load voltage VPIEZO, the longer the time for the set current in the main coil $L_{MAIN}$ to develop. If the load voltage VPIEZO approaches a critical voltage, the discharge current is limited and pinched off. This has the result that the load cannot be fully discharged, and a remaining residual charge remains in the injector.

Until now, one of the solutions to this problem has been that at the end of the discharge phase, a linear current regulator or resistor LINEAR DISCHARGE is connected in parallel with the load, and the remaining charge converted to heat. The switching element M7 of the current regulator LINEAR DISCHARGE must have an appropriate regulation and protection circuit.

In particular, in the case of injectors with a high energy requirement and a high injection rate, this method increasingly creates problems through heating the electronics, since the remaining residual energy must be dissipated as lost power. The non-recovered charge must be supplied as additional energy by the intermediate circuit converter DCDC1. Additionally, restrictions must be accepted in terms of minimum spacing between sequential injection pulses due to the long delay/settling and activation times of the linear regulation path, and this impairs the performance of the overall system.

The synchronization of the discharge currents at the transition between the clocked and linear operating modes which can, among other things, impair desired sensor effects when closing the injector or make evaluation of the drive through sensors impossible, is also problematic.

SUMMARY

It is the object of the invention to provide a device for charging and discharging a capacitive load with which the most complete possible discharge of the load is possible without high thermal stress.

The device, according to embodiments of the invention, for charging and discharging a capacitive load accordingly includes a first capacitor with a first and a second supply terminal, and a down-up converter with a first and a second input terminal which are connected to the first and the second supply terminals, respectively, of the first capacitor, wherein the second input terminal of the converter is connected to a ground terminal, the converter including a series circuit of a first and a second switching element is arranged between the first and the second input terminals, and the connecting point of the two switching elements is connected to a first output terminal of the converter through a main coil, wherein a second output terminal of the converter is connected to the ground terminal. The device also includes an output circuit with a capacitive load, which is arranged between a first and a second output circuit terminal, which are connected to the output terminals of the converter; and a discharge circuit formed with the output circuit, the main coil and the second switching element, in which an additional capacitor is arranged, which is connected to a charging circuit for charging to a specified voltage, wherein the polarity of the voltage corresponds to that of the load voltage in the charged state of the capacitive load.

The voltage at the additional capacitor and the voltage at the capacitive load thus enter into a loop current equation of the discharge circuit with the same arithmetic sign, so that they both contribute to charging the main coil when discharging.

In a first embodiment of the invention, the additional capacitor is arranged between the second switching element and the ground terminal. The charging circuit for this additional capacitor may, for example, be a further switched-mode converter. Here, however, in particular, increased demands are placed on the equivalent series resistance of the additional capacitor, since the component is subject to the full peak current of the main coil.

In an advantageous alternative embodiment of the invention, a filter circuit and the additional capacitor are arranged in the output circuit between the down-up converter and the output circuit.

Through this measure, the down-up converter becomes able to transfer the charge stored in the capacitive load almost entirely back into the first capacitor, wherein the additional capacitor is only subject to the current smoothed by the filter circuit, and does not therefore have to be designed for high peak currents.

The additional capacitor may here be connected between the filter circuit and the capacitive load in the high-side path of the output circuit, but may however equally be arranged in the low-side path between the capacitive load and the ground terminal.

In a further development or embodiment of the down-up converter, a third switching element is arranged between the main coil and the filter circuit, and a fourth switching element is arranged between the main coil and the ground terminal. A full-bridge converter is created in this way, which permits a charging of the capacitive load to a voltage that is greater than the voltage at the first capacitor.

In an advantageous development, a charge switching element is arranged between the connecting point of the additional capacitor and the capacitive load and the ground potential. Together with the first transistor and the main coil, this charge switching element forms the charging circuit via which the additional capacitor may be charged from the first capacitor up to a specified voltage. The point here is that, depending on the capacitance of the additional capacitor, a charge is applied that is greater than the charge of the capacitive load, so that after the discharge of the capacitive load, a residual charge still remains on the additional capacitor which maintains the flow of current into the main coil.

In an alternative embodiment of a charging circuit for the additional capacitor, the first capacitor is connected to the output of a flyback converter, and the transformer of the flyback converter includes a second secondary coil, whose output terminals are connected through a rectifier to the terminals of the additional capacitor.

The additional capacitor may here be recharged in step with the voltage regulation at the first capacitor.

In an advantageous development, the additional capacitor has a capacitance that is at least 10 times greater than the capacitive load. Through this, the voltage variability at the additional capacitor during the charging and discharging processes at the capacitive load may be reduced.

In order to avoid a negative charging of the capacitive load, a protection diode, polarized in the blocking direction, may advantageously be arranged between the connecting point of the additional capacitor and the capacitive load and the ground potential.

The protection diode may here be connected in parallel with the charge switching element, and in particular be formed by a substrate diode of this load switching element.

In order to be able to charge and discharge a plurality of output circuits connected in parallel using the device according to embodiments of the invention, the output circuit, or the output circuits, may include a selection switch in series with the capacitive load.

BRIEF DESCRIPTION OF THE DRAWINGS

The exemplary embodiments of the invention are described in more detail below with the help of figures. Here

DETAILED DESCRIPTION

Figure 1:
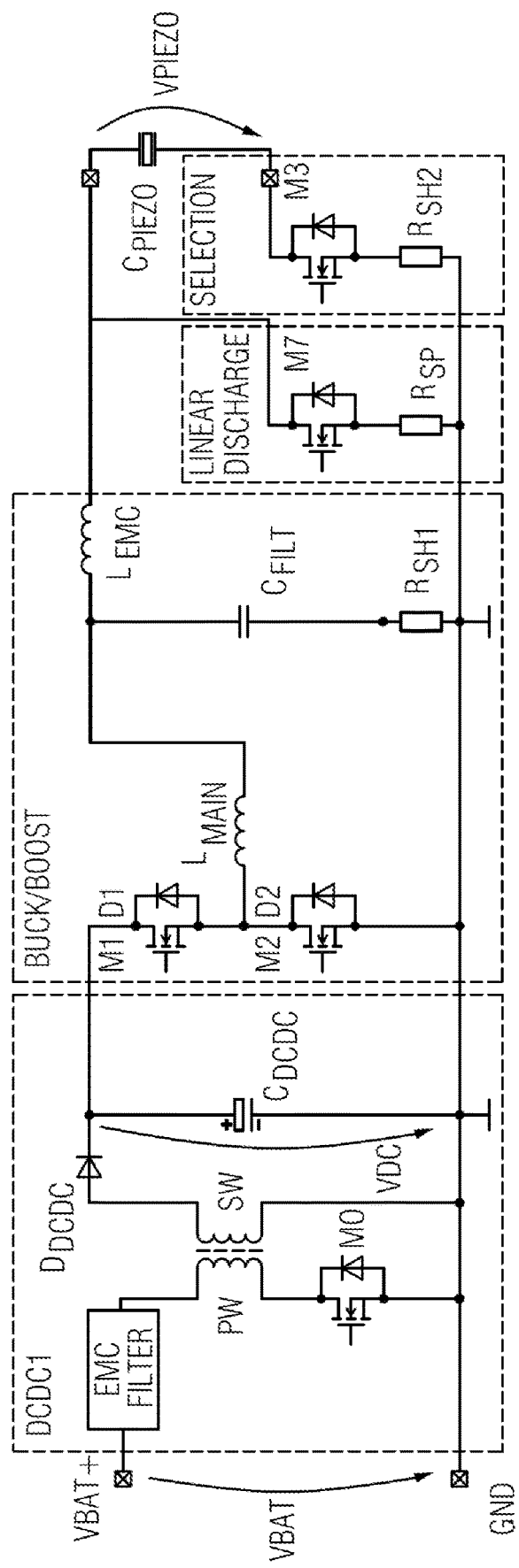
FIG. 1 shows a device for charging and discharging a capacitive load according to the prior art.
Figure 3:
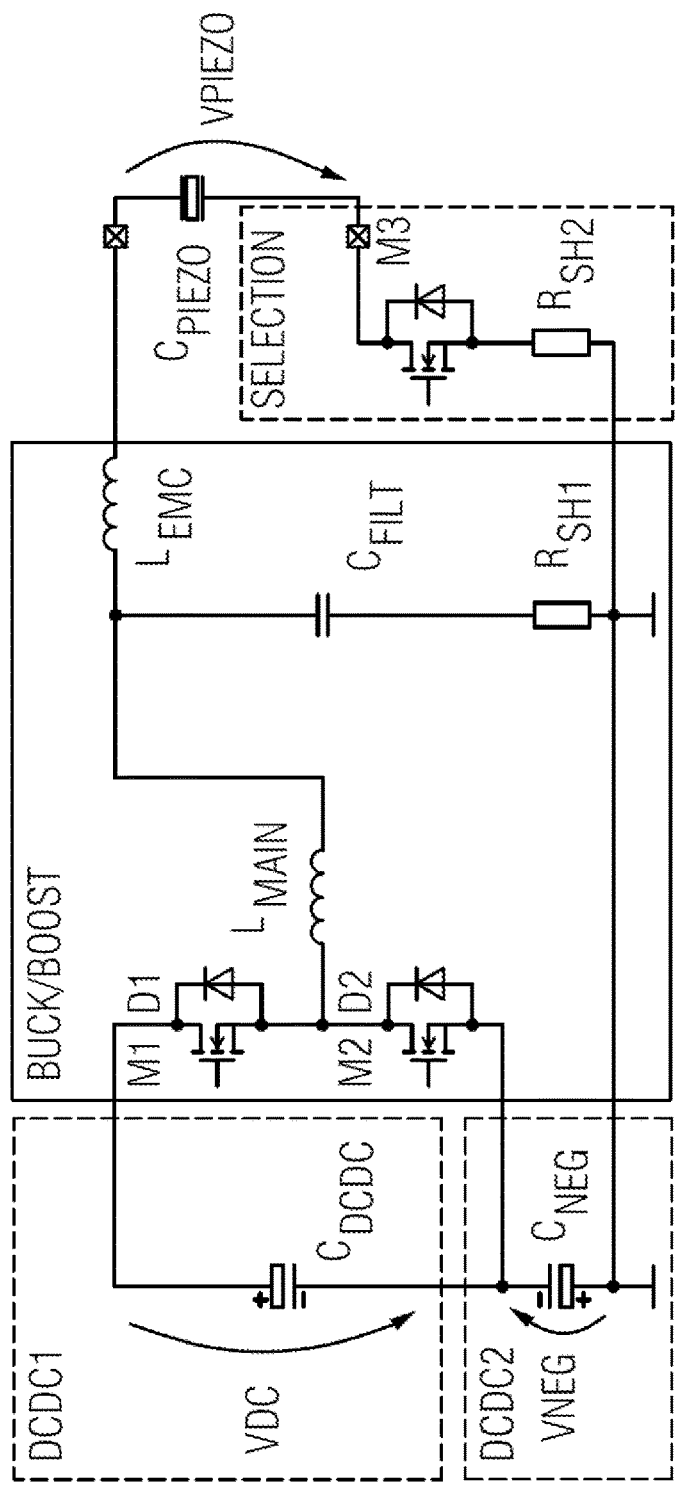
FIG. 3 shows a first embodiment of a device according to the invention for charging and discharging a capacitive load.

FIG. 3 shows a first embodiment of a device according to the invention with an additional capacitor $C_{NEG}$, which is connected in a circuit according to FIG. 1 between the second transistor M2 and the ground potential GND. The additional capacitor $C_{NEG}$ is charged here by a charging circuit formed of a second switch-mode regulator DCDC2 to a voltage VNEG, which creates a potential that is negative with respect to the ground potential GND at the connecting point of the second transistor M2 to the additional capacitor $C_{NEG}$, against which the capacitive load $C_{PIEZO}$ may always be nearly completely discharged through the main coil $L_{MAIN}$, in that the energy stored in the capacitive load $C_{PIEZO}$ is fed back into the first capacitor $C_{DCDC}$. The peak current through the main coil $L_{MAIN}$ flows, however, through the additional capacitor $C_{NEG}$, which requires additional capacitor $C_{NEG}$ to be of appropriately robust design.

Figure 2:
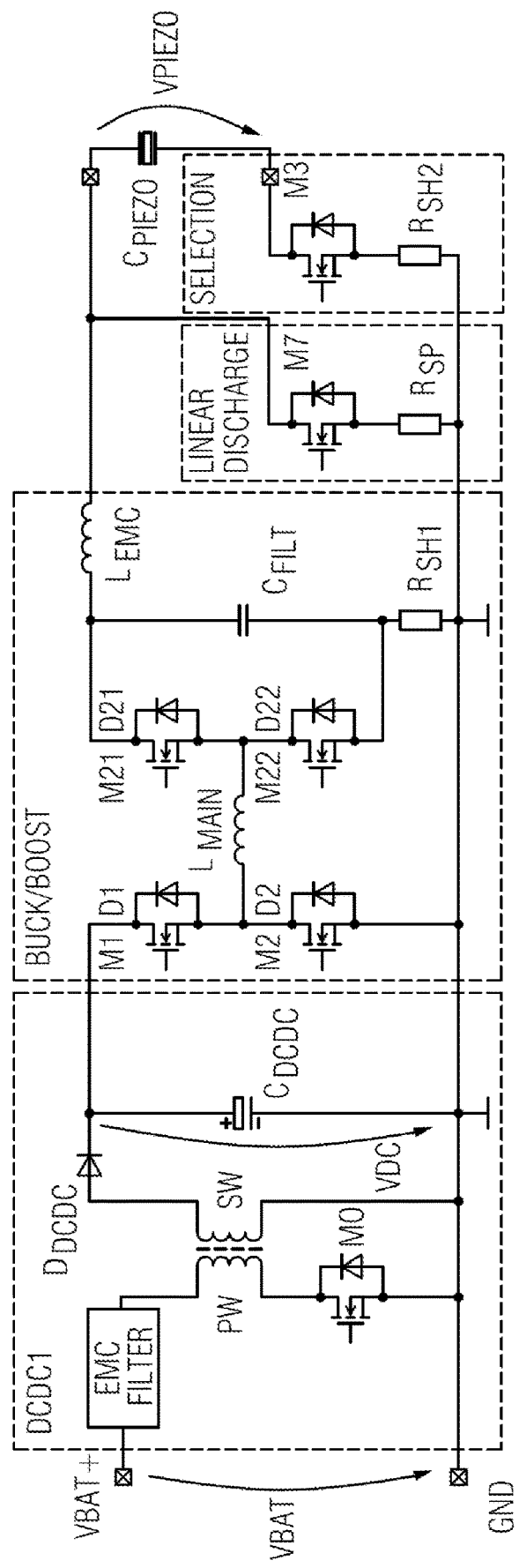
FIG. 2 shows an alternative device for charging and discharging a capacitive load according to the prior art.

The additional dissipative discharge path LINEAR DISCHARGE of FIGS. 1 and 2 may now be omitted, which is indicated in that this part of the circuit has been removed.

The embodiment of FIG. 3 may also be realized in a full-bridge converter according to FIG. 2.

Figure 4:
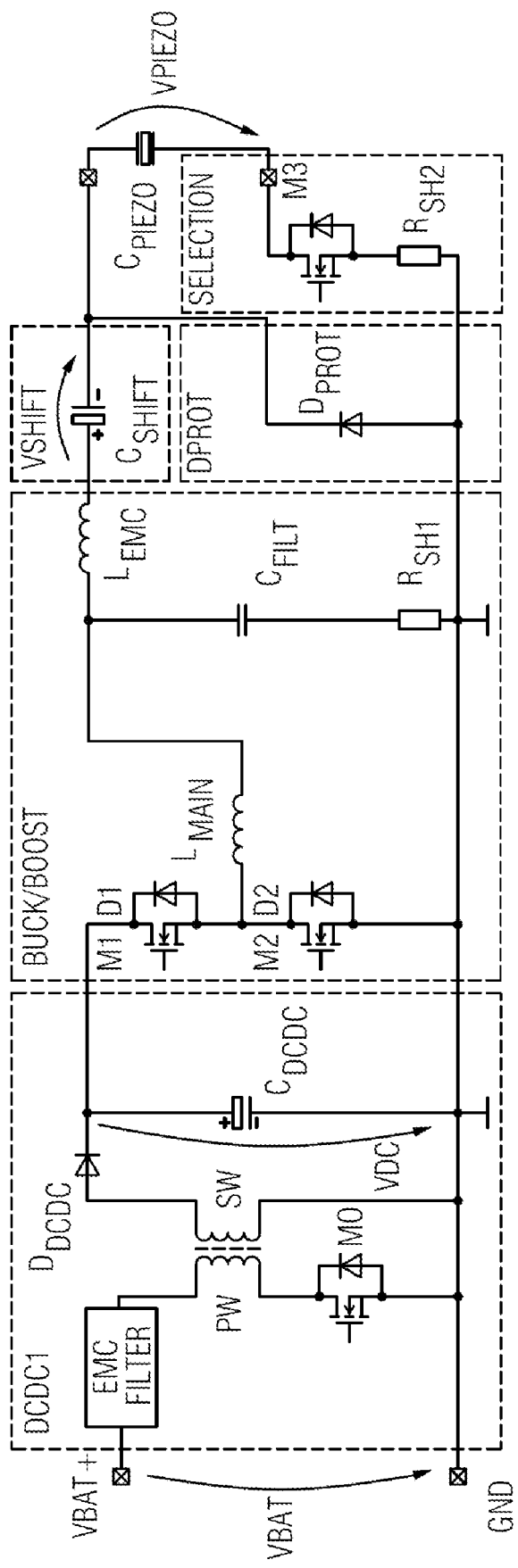
FIG. 4 shows a second embodiment of a device according to the invention for charging and discharging a capacitive load.

FIG. 4 shows an alternative, advantageous embodiment of the invention. There, in a circuit topology according to FIG. 1, an additional capacitor $C_{SHIFT}$ is arranged between the filter circuit $C_{FILT}$, $L_{EMC}$ and the capacitive load $C_{PIEZO}$ the capacitor $C_{SHIFT}$ being charged to a voltage VSHIFT, whose voltage is aligned to the voltage at the capacitive load $C_{PIEZO}$. A protection diode $D_{PROT}$ is also provided, connected between the connecting point of the additional capacitor $C_{SHIFT}$ and the capacitive load $C_{PIEZO}$ and the ground potential GND. Protection diode $D_{PROT}$ prevents the capacitive load $C_{PIEZO}$ being charged negatively when discharged.

When the capacitive load $C_{PIEZO}$ is discharged by the down-up converter BUCK/BOOST, a working voltage, raised by the voltage VSHIFT dropped across the additional capacitor $C_{SHIFT}$, is created for the down-up converter BUCK/BOOST from the sum voltage of VSHIFT and VPIEZO resulting from the series connection of the capacitive load $C_{PIEZO}$ and of the additional capacitor $C_{SHIFT}$. Through a suitable choice of the level of the voltage VSHIFT at the additional capacitor $C_{SHIFT}$, the working point may be adjusted such that the down-up converter BUCK/BOOST may always operate at a defined working point, and generate the development of a current in the main coil $L_{MAIN}$. This can be described by equation (11).

$$\frac{di}{dt} = \frac{VPIEZO + VSHIFT}{L_{MAIN}} \quad (11)$$

In this way, even at load voltages of VPIEZO=0 V, current may be developed in the main coil $L_{MAIN}$, and complete discharge of the capacitive load $C_{PIEZO}$ may occur, even down into the negative voltage range. Since the discharge current of the capacitive load $C_{PIEZO}$ also discharges the additional capacitor $C_{SHIFT}$, it follows that this must support a higher charge than the capacitive load $C_{PIEZO}$, so that after capacitive load $C_{PIEZO}$ has been discharged an adequate voltage VSHIFT is still present across the additional capacitor $C_{SHIFT}$.

Charging the load the opposite way to excessively high negative voltage values may be achieved, for example, through the use of the protection diode $D_{PROT}$, which then limits the negative potential at the capacitive load $C_{PIEZO}$ to the forward voltages of the sum of the voltage V(D_PROT) at the protection diode $D_{PROT}$ and the voltage V(D_M3) at the selection transistor M3. If the clocked discharge path continues to be driven after the charge has been fully removed from the capacitive load, the protection diode $D_{PROT}$ effects a "disconnection" of the capacitive load $C_{PIEZO}$ from the down-up converter BUCK/BOOST, since protection diode $D_{PROT}$ represents an appropriate bypass current path. Complex detection of the end of discharge is thus unnecessary.

A further advantage of the topology described above is the implicit charge equilibrium in the additional capacitor $C_{SHIFT}$ after a complete charge-discharge cycle. The same charge flows both when charging and discharging through the additional capacitor $C_{SHIFT}$ and the capacitive load $C_{PIEZO}$. If therefore the same charge level is reached at the load after a cycle as before the cycle (e.g. 0 μAs), then the charge at the additional capacitor $C_{SHIFT}$ is again balanced. In the ideal case, therefore, with the exception of the initial charging and any leakage currents that may occur in the additional capacitor $C_{SHIFT}$, no further power is needed to supply the additional capacitor $C_{SHIFT}$. The charge stored in the capacitive load $C_{PIEZO}$ may be fully recovered apart from smaller power losses resulting from ESR, RDSon (the drain-to-source "on" resistance) of the switching element and conductive tracks.

In practical application, the down-up converter BUCK/BOOST with the additional capacitor $C_{SHIFT}$ may be operated such that the discharge after a cycle is always slightly larger than the charge (by 5-10%), and that a simple recharging of the additional capacitor $C_{SHIFT}$ is sufficient for balancing.

The size of the capacitance of the additional capacitor $C_{SHIFT}$ depends on the maximum voltage swing to be allowed at it, and should be many times the load capacitance. If a voltage swing in practical application at the additional capacitor $C_{SHIFT}$ of at most 2% of the load voltage is to be achieved, then the capacitance of the additional capacitor $C_{SHIFT}$ may need to be about 50 times greater than the maximum load capacitance.

Figure 5:
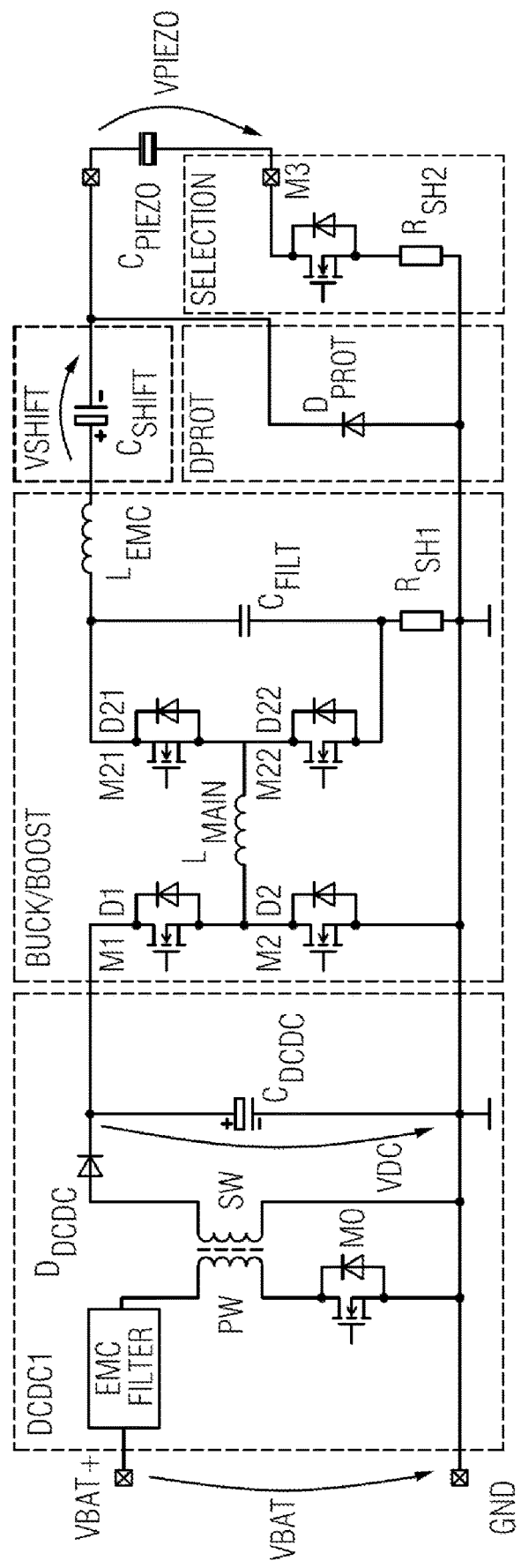
FIG. 5 shows a first development of the second embodiment of a device according to the invention for charging and discharging a capacitive load.

FIG. 5 shows a development of the down-up converter BUCK/BOOST according to FIG. 4. The down-up converter BUCK/BOOST is designed there as a full-bridge converter as in FIG. 2, wherein a third switching element M21 is arranged between the main coil $L_{MAIN}$ and the filter circuit $C_{FILT}$, $L_{EMC}$, and a fourth switching element M22 is arranged between the main coil $L_{MAIN}$ and the ground terminal GND. The series circuit of the third and fourth switching elements M21, M22 formed in this way is connected in parallel with the capacitor $C_{FILT}$ of the filter circuit $C_{FILT}$, $L_{EMC}$. A current measuring resistor $R_{SH1}$ may be connected between this parallel circuit and the ground terminal GND.

Figure 6:
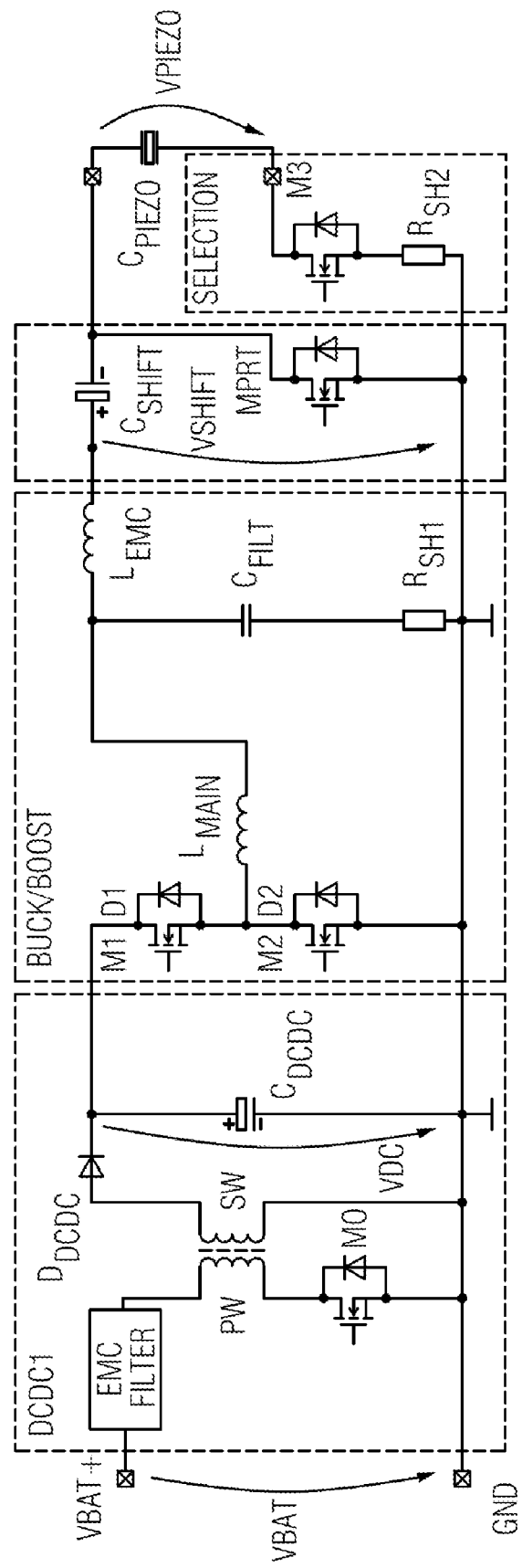
FIG. 6 shows a second development of the second embodiment of a device according to the invention for charging and discharging a capacitive load.

Initial charging of the additional capacitor $C_{SHIFT}$ to a defined voltage may be done using a number of methods. In a first embodiment according to FIG. 6, the feed may be made via the clocked down-up converter BUCK/BOOST with an additional charging path with a transistor MPRT.

If the protection diode $D_{PROT}$ is replaced by the active switch MPRT, then when the load is not selected by the selection transistor M3 (M3 blocking) and with transistor MPRT conducting, the additional capacitor $C_{SHIFT}$ may be charged via the existing down-up converter BUCK/BOOST. Since the negative pole of the additional capacitor $C_{SHIFT}$ is connected to the ground potential GND during the charging phase, the voltage VSHIFT at the additional capacitor $C_{SHIFT}$ may be regulated by a simple ground-referenced voltage measurement.

Figure 7:
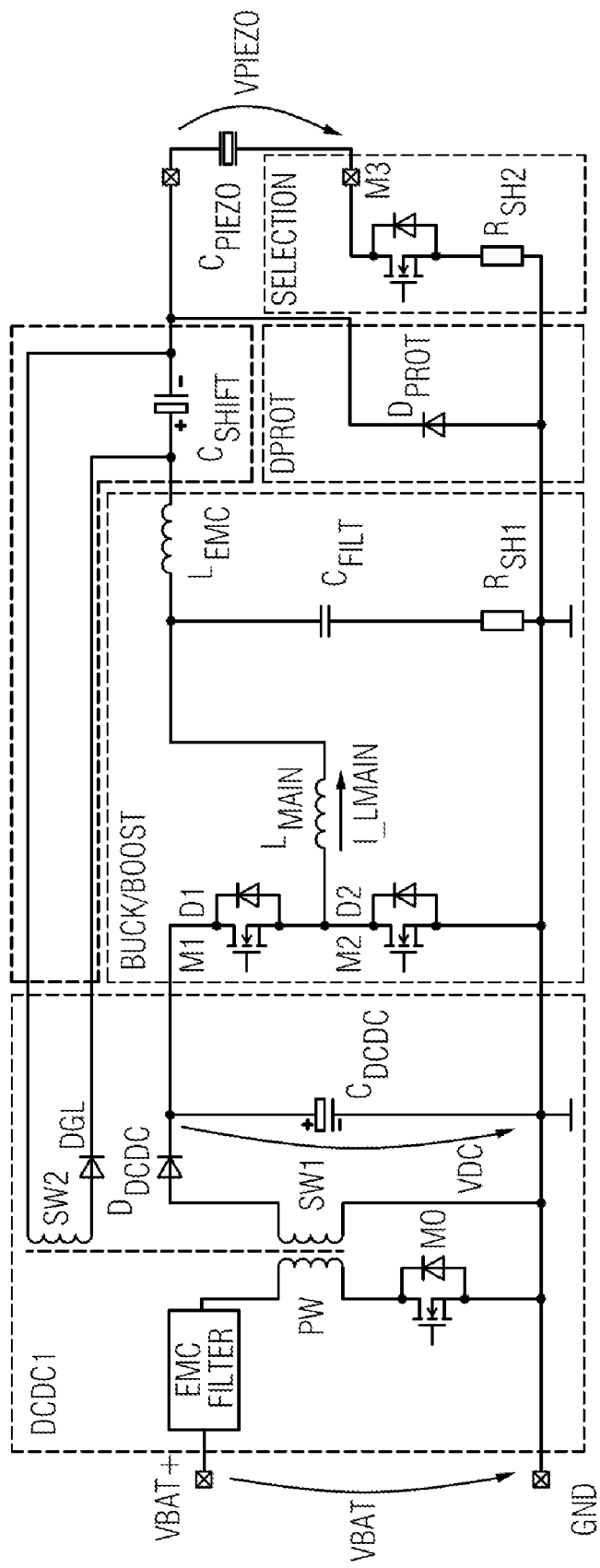
FIG. 7 shows a third development of the second embodiment of a device according to the invention for charging and discharging a capacitive load.

FIG. 7 shows an initial charging circuit for the additional capacitor $C_{SHIFT}$ with a second secondary winding SW2 of the transformer of the first DC-DC converter DCDC1 which is coupled to this with a fixed winding ratio. The second secondary winding SW2 is connected through a rectifier DGL, which in this case is implemented as a simple diode, to the additional capacitor $C_{SHIFT}$.

If the stray inductances of the transformer are negligibly small, then no specific regulation is required for the charging path for the additional capacitor $C_{SHIFT}$, since the auxiliary winding SW2 tracks the intermediate circuit voltage VDC proportionally. The coupled output voltages VDC and VSHIFT are thus determined by the transformer winding ratio. A regulation of the intermediate circuit voltage VDC thus also determines the voltage at the additional capacitor $C_{SHIFT}$.

The device, according to embodiments of the invention, has the advantages that the working range of a DC-DC converter may be extended through simple measures to the extent that it can discharge capacitive loads down to a voltage range of 0 V. The discharge may take place with low losses down to the load voltage of 0 V, and the charge stored in the load may to a large extent be fed back into the intermediate circuit. In addition, through the insertion of a reactive storage element pre-charged to a voltage in series with the load, only reactive power is required during operation, which may almost entirely be recovered.

The requirements of the electrical series voltage in the second variant of the placement of the additional capacitor $C_{SHIFT}$ are reduced, since only the filtered and averaged load current, rather than the higher peak current, of the main coil $L_{MAIN}$ has to be passed through the additional capacitor $C_{SHIFT}$. A second, expensive, DC-DC converter to generate a negative auxiliary voltage may thus be avoided.

The position of the additional capacitor $C_{SHIFT}$ is independent of the chosen topology, and may thus be used, for example, in the case of half-bridge topologies according to FIG. 1 and in full-bridge topologies according to FIG. 2—and may be inserted at different locations such as, for example, in the high-side path (see FIGS. 4 to 6) or in the low-side path of the load circuit.

The invention claimed is:

1. A device for charging and discharging a capacitive load, comprising:
    a first capacitor with a first and a second supply terminal,
    a down-up converter with a first and a second input terminal which are connected to the first and the second supply terminals, respectively, of the first capacitor, wherein the second input terminal of the converter is connected to a ground terminal, the converter comprising a series circuit of a first and a second switching element arranged between the first and the second input terminals, and a main coil connected to a connecting point of the two switching elements such that the connecting point is connected to a first output terminal of the converter through the main coil, and a second output terminal of the converter is connected to the ground terminal,
    an output circuit corresponding to a capacitive load of the converter, the capacitive load arranged between a first and a second output circuit terminal the first and second output circuit terminals are connected to the output terminals of the converter,
    a discharge circuit formed with the output circuit, the main coil and the second switching element, the discharge circuit comprising an additional capacitor,
    a charging circuit connected to the additional capacitor, the charging circuit charging the additional capacitor to a specified voltage, wherein the polarity of the voltage of the additional capacitor corresponds to the load voltage across the capacitive load in the charged state of the capacitive load, and
    further comprising a filter circuit arranged between the down-up converter and the output circuit, and the additional capacitor is arranged between the filter circuit and the output circuit.

2. The device as claimed in claim 1, further comprising a third switching element arranged between the main coil and the filter circuit, and a fourth switching element arranged between the main coil and the ground terminal.

3. The device as claimed in claim 1, further comprising a charge switching element arranged between a connecting point of the additional capacitor and the capacitive load, and the ground potential.

4. The device as claimed in claim 1, further comprising a flyback converter having an output connected to the first capacitor, the flyback converter comprising a transformer including a first and a second secondary coil, the flyback converter further including a rectifier, wherein output terminals of the second secondary coil are connected to terminals of the additional capacitor, at least one of the output terminals of the second secondary coil being connected to a corresponding terminal of the additional capacitor via the rectifier.

5. The device as claimed in claim 1, wherein the additional capacitor has a capacitance that is at least 10 times greater than a capacitance of the capacitive load.

6. The device as claimed in claim 1, further comprising a protection diode, polarized in a blocking direction and arranged between a connecting point of the additional capacitor and the capacitive load, and the ground potential.

7. The device as claimed in claim 6, further comprising a charge switching element arranged between a connecting point of the additional capacitor and the capacitive load, and the ground potential, wherein the charge switching element is connected in parallel with the protection diode.

8. The device as claimed in claim 1, wherein the output circuit includes a selection switch connected in series with the capacitive load.

9. The device as claimed in claim 1, wherein the additional capacitor is arranged in series between the converter and the capacitive load.

10. The device as claimed in claim 9, further comprising a charge switching element arranged between a connecting point of the additional capacitor and the capacitive load and a ground potential.

11. The device as claimed in claim 9, further comprising a filter circuit arranged between the main coil and the additional capacitor, the filter circuit comprising a capacitor and a coil.

12. The device as claimed in claim 1, wherein the additional capacitor is connected in series with the mail coil and the capacitive load.

13. A device for charging and discharging a capacitive load, comprising:
a first capacitor with a first and a second supply terminal,
a down-up converter with a first and a second input terminal which are connected to the first and the second supply terminals, respectively, of the first capacitor, wherein the second input terminal of the converter is connected to a ground terminal, the converter comprising a series circuit of a first and a second switching element arranged between the first and the second input terminals, and a main coil connected to a connecting point of the two switching elements such that the connecting point is connected to a first output terminal of the converter through the main coil, and a second output terminal of the converter is connected to the ground terminal,
an output circuit corresponding to a capacitive load of the converter, the capacitive load arranged between a first and a second output circuit terminal the first and second output circuit terminals are connected to the output terminals of the converter,
a discharge circuit formed with the output circuit, the main coil and the second switching element, the discharge circuit comprising an additional capacitor,
a charging circuit connected to the additional capacitor, the charging circuit charging the additional capacitor to a specified voltage, wherein the polarity of the voltage of the additional capacitor corresponds to the load voltage across the capacitive load in the charged state of the capacitive load, and
further comprising a flyback converter having an output connected to the first capacitor, the flyback converter comprising a transformer including a first and a second secondary coil, the flyback converter further including a rectifier, wherein output terminals of the second secondary coil are connected to terminals of the additional capacitor, at least one of the output terminals of the second secondary coil being connected to a corresponding terminal of the additional capacitor via the rectifier.

14. The device as claimed in claim 13, wherein the additional capacitor is arranged in series between the converter and the capacitive load.

15. A device for charging and discharging a capacitive load, comprising:
a first capacitor with a first and a second supply terminal,
a down-up converter with a first and a second input terminal which are connected to the first and the second supply terminals, respectively, of the first capacitor, wherein the second input terminal of the converter is connected to a ground terminal, the converter comprising a series circuit of a first and a second switching element arranged between the first and the second input terminals, and a main coil connected to a connecting point of the two switching elements such that the connecting point is connected to a first output terminal of the converter through the main coil, and a second output terminal of the converter is connected to the ground terminal,
an output circuit corresponding to a capacitive load of the converter, the capacitive load arranged between a first and a second output circuit terminal the first and second output circuit terminals are connected to the output terminals of the converter,
a discharge circuit formed with the output circuit, the main coil and the second switching element, the discharge circuit comprising an additional capacitor, and
a charging circuit connected to the additional capacitor, the charging circuit charging the additional capacitor to a specified voltage, wherein the polarity of the voltage of the additional capacitor corresponds to the load voltage across the capacitive load in the charged state of the capacitive load,
wherein the additional capacitor is arranged between the second switching element and the ground terminal.

16. The device as claimed in claim 15, wherein the charging circuit is a second DC-DC converter.

* * * * *